United States Patent [19]

Mills

[11] Patent Number: 4,694,584

[45] Date of Patent: Sep. 22, 1987

[54] REDUCED VOLUME DIGITAL INCLINOMETER

[76] Inventor: Floyd J. Mills, 815 Alpine #4, Boulder, Colo. 80302

[21] Appl. No.: 869,198

[22] Filed: May 30, 1986

[51] Int. Cl.⁴ .......................... G01C 9/06; G01C 9/12
[52] U.S. Cl. ....................................... 33/366; 33/346; 33/396
[58] Field of Search .......................... 33/346, 366, 396

[56] References Cited

U.S. PATENT DOCUMENTS

| | | | |
|---|---|---|---|
| 2,407,580 | 9/1946 | Scott | 33/250 |
| 2,598,355 | 5/1952 | Cloud | 33/220 |
| 2,924,022 | 2/1960 | Callahan | 33/220 |
| 2,952,920 | 9/1960 | Cloud | 33/396 |
| 2,990,622 | 7/1961 | Johnson | 33/215 |
| 3,950,859 | 4/1976 | Kramer | 33/352 |
| 4,096,638 | 6/1978 | Schimming | 33/396 |
| 4,159,577 | 7/1979 | Bergkvist | 33/366 |
| 4,253,242 | 3/1981 | McInerney | 33/366 |
| 4,277,895 | 7/1981 | Wiklund | 33/366 |
| 4,467,527 | 8/1984 | North et al. | 33/366 |
| 4,486,844 | 12/1984 | Brunson et al. | 33/366 |
| 4,492,029 | 1/1985 | Tanaka et al. | 33/391 |
| 4,606,133 | 8/1986 | Mills | 33/346 |

FOREIGN PATENT DOCUMENTS

| | | | |
|---|---|---|---|
| 197801 | 1/1978 | U.S.S.R. | 33/366 |
| 972212 | 1/1982 | U.S.S.R. | 33/391 |

Primary Examiner—Richard R. Stearns
Attorney, Agent, or Firm—Robert C. Dorr

[57] ABSTRACT

A high resolution, digital inclinometer having a full 360° linear range with accuracy which is independent of the angle of inclination. The linearity of the inclinometer is essentially flat throughout its range and greatly exceeds analog equivalents. A mathematical model to predict resolution is presented which allows the designer to design the device to maximize resolution at transverse angles. The device can be used in a celestial navigational instrument by storing celestial navigation tables and providing clock and inclination angle information so that the device can be pointed at particular stars and a latitude and longitude calculated. The inclinometer is capable of minimizing effects of pressure and/or temperature which cause microbubbles to form within the supporting fluid. These microbubbles degrade the optical detection technique and are eliminated by minimizing the volume of the fluid chamber and providing large flat surfaces which are easily deflectable to compensate for changes in the volume of the fluid. The large flat surfaces are also used as optical windows to allow the optical detector to be mounted on the outer surface and eliminate the complexity of mounting the optical detector devices, which include the emitter and detector, within the fluid cavity.

6 Claims, 14 Drawing Figures

REDUCED VOLUME DIGITAL INCLINOMETER

BACKGROUND OF THE INVENTION

1. Field of the Invention

The present invention pertains generally to inclinometers and more specifically to high resolution digital inclinometers.

2. Background of the Invention

This application comprises an improvement of a previously filed and co-pending application Ser. No. 737,786 entitled "HIGH RESOLUTION DIGITAL INCLINOMETER" filed May 28, 1985 by Floyd J. Mills, and now Pat. No. 4,606,133, which is specifically incorporated herein by reference for all that it discloses.

The previously filed application disclosed a portable hand-held inclinometer which has high resolution and is capable of providing a digital readout of inclination relative to various angles such as level, plumb and preselected tare angles. It also disclosed a device which is capable of measuring difference angles between two surfaces and the ability to produce an audible tone when the device is inclined at an preselected angle, the ability to hold a specific angle for display and other automated features coupled with a high resolution instrument which has not been shown in the prior art and which incorporates features which are greatly needed in such a device.

A patentability search was performed prior to filing the previously filed application. The following references were uncovered in the search.

| U.S. Pat. No. | Inventor | Issue Date |
| --- | --- | --- |
| 2,407,580 | Scott | Sept. 10, 1946 |
| 2,598,355 | Cloud | May 27, 1952 |
| 2,924,022 | Callahan | Feb. 9, 1960 |
| 2,952,920 | Cloud | Sept. 20, 1960 |
| 3,950,859 | Kramer | April 20, 1976 |
| 4,096,638 | Schimming | June 27, 1978 |
| 4,277,895 | Wiklund | July 14, 1981 |
| 4,486,844 | Brunson et al. | Dec. 4, 1984 |

A discussion of these references, as it appears in the previously filed application, is set forth below:

U.S. Pat. No. 2,407,580 issued to Scott on Sept. 10, 1946 discloses a long period pendulum which utilizes a light source 18 which is focused by a lense 20 on a Lucite fly wheel 6. Photo cell 26 is arranged to detect light which is transmitted through the Lucite wheel 6. The Lucite wheel is mounted on a ribbon 4 and disposed on a housing which is filled with a liquid 28 having about the same specific gravity as the Lucite fly wheel. A portion of the Lucite fly wheel is painted with an opaque paint to block light as it flows through the wheel. A portion of the wheel is slightly weighted so that it tends to remain in a given rotational position on its axis. A ribbon support of the fly wheel gives practically no static friction and very small restoring forces are produced as compared to the gravitational force on the unbalanced fly wheel. A liquid of approximately the same specific gravity as the fly wheel unweights the ribbon and provides the proper amount of friction to obtain critical damping. The amount of light transmitted through the wheel determines the inclination of the device which is used to drive a servo to return a platform to a level position.

U.S. Pat. No. 2,924,022 issued to Callahan on Feb. 9, 1960 discloses rotary indicators utilizing a pendulum 23 which is placed in equilibrium by the use of a buoyancy float 59 to provide buoyancy approximately equal to the weight of the moving assembly. This is used to minimize and substantially eliminate friction on bearings 17 and 18 which function primarily as guides once the device is in equilibrium. As illustrated in FIG. 10, the rotary indicator comprises a mechanical pointer which aligns with a dial on the device to indicate the rotary position of the inclinometer.

U.S. Pat. No. 3,950,859 issued to Kramer on Apr. 20, 1976 discloses an angular displacement measuring apparatus which has electronic circuitry for determining instantaneous angular displacement relative to an external magnetic field or angular displacement in a verticl direction. The Kramer device uses a disk having sequences of transparent and opaque cells in circular tracks which are arranged relative to light sources and track oriented photo-sensitive devices to provide data relative to the orientation of the disk. FIG. 3 discloses standard bearing support without the use of floatation for eliminating frictional forces.

U.S. Pat. No. 2,952,920 issued to Cloud on Sept. 20, 1960 discloses a ballast compensate pendulum which utilizes a ballast chamber 22 immersed in a damping fluid 20 to provide buoyant effects which are equally distributed around the axis of wire support 11 and approximate the weight of the disk. Portions 12 and 13 of the disk are removed to cause the device to act as a pendulum. Adjustment screw 29 adjusts the pressure on fluid 20 to precisely place disk 10 in equilibrium within fluid 20. The Cloud patent does not disclose a sensing device but refers to U.S. Pat. No. 2,598,355 issued to Cloud on May 27, 1952 which uses a photo-electric cell assembly to sense the unequal distribution of light which is amplified by an amplifier to energize a servomotor.

U.S. Pat. No. 4,096,638 issued to Schimming on June 27, 1978 discloses a pendulum device having floats 102 which partially eliminate friction on bearings 92 and have pointers 98 which indicate the inclination of the device. Floats 102 float on the surface of the fluid disposed in the device.

U.S. Pat. No. 4,277,895 issued to Wiklund on June 14, 1981 discloses an apparatus for measuring acceleration which uses magnetic forces. Light emitting diodes 9 and 10 are located on one side of the plate 8 and a corresponding pair of light detectors 12 and 13 are located on the other side of the plate. The current required to produce a magnetic field to maintain the position of plate 18 is directly proportional to the acceleration of the device. A microprocessor 60 is utilized to quickly and accurately generate the required correction current.

U.S. Pat. No. 4,486,844 issued to Brunson et al. on Dec. 4, 1984 discloses a dual axis inclination measuring apparatus and method which has two sensor devices for measuring the inclination of two surfaces 18 and 19. Indicator unit 3 is capable of freezing a particular reading on its display and can produce a difference angle reading indicative of a difference in inclination of the two surfaces 18 and 19.

As can be seen from these references, the general concept of the use of buoyancy to place the moveable portion of an inclinometer in equilibrium in a fluid to reduce frictional forces has generally been shown in the Scott, Callahan, Cloud and somewhat in the Schimming patents. Additionally, optical detection of the position of a disk has been shown in the Scott and Cloud patents. These devices are relatively crude devices for producing a difference signal by detecting the total amount of light transmitted through a partially opaque disk.

Kramer discloses a more elaborate system of detecting the position of a digitally encoded disk to more precisely determine the location of the disk. Although Kramer is capable of producing a digital display of the position of the disk, Kramer does not use buoyancy to substantially eliminate frictional effects and produce a high resolution output. Moreover, the hard wired electronics utilized by Kramer, as illutrated in FIG. 6, are merely capable of indicating the absolute position of the disk and cannot produce digital displays of inclination relative to the various angles such as plumb, level and tare. Kramer is incapable of performing program functions which can be carried out by microprocessor control to allow the flexibility of producing digital readouts which can indicate these various angles, as well as providing a display of difference angles between two surfaces and generating an audible tone. The disk utilized by Kramer constitutes an absolute encoding disk which is used to produce a direct read-out of the angular position of the disk which is proportional to inclination. To produce a high resolution read-out with an absolute encoding disk, a large number of tracks would be required as well as a large number of detectors and associated circuitry for reading these tracks. Hence, Kramer cannot provide flexibility in producing a digital display signal and cannot practically provide a high resolution read-out.

The Wiklund device discloses the use of a microprocessor in conjunction with an accelerometer. However, the Wiklund device utilizes the microprocessor to calculate and control the generation of error currents for energizing electromagnetic coils to maintain the pendulum in a centered position. The microprocessor device of Wiklund is not used for performing various program functions to provide various digital displays of inclination.

The Brunson et al. reference, on the other hand, discloses the use of a computer to generate angle readings which constitute difference angles of the inclination between two remotely located surfaces. Although Brunson et al. discloses the generation of a difference angle, there is no disclosure of program functions for generating digital signals of inclination relative to plumb, level, and tare angles, the use of an audible indicator or the use of buoyancy to place a disk encoding wheel is equilibrium to provide a high resolution read-out. Rather, the Brunson et al. device is an extremely sensitive device for measuring very slight differences in the inclination of two surfaces 18 and 19 and is incapable of providing a high resolution read-out for a wide range of inclination angles and generation of difference angles from a single sensing unit. Moreover, Brunson et al. does not disclose or teach the use of buoyancy, in any manner, to produce an inclination angle signal.

During the course of prosecution of the previously filed application, the following references were cited by the Examiner.

| U.S. Pat. No. | Inventor | Issue Date |
| --- | --- | --- |
| 2,990,622 | Johnson | 7-4-61 |
| 4,253,242 | McInerney | 3-3-81 |
| 4,467,527 | North et al. | 8-28-84 |
| 4,492,029 | Tanaka et al. | 1-8-85 |

| U.S. Pat. No. | Inventor | Issue Date |
| --- | --- | --- |
| Russian Patent 197,801 | | 1-1978 |
| Russian Patent 972,212 | | 1-1982 |

McInerney discloses a digital angle indicator having an enclosure 40 which is partially filled with a fluid. A series of slots 46, 48, 50 and 52 are aligned with a plurality of optical devices 54, 56 to provide alignment information. McInerney provides essentially 8 positional information data signals and a low resolution system. McInerney does not use equilibrium to eliminate frictional forces between shaft 32 and bearings 30A and 30B.

Johnson discloses a combination protractor and level which uses a disk having a weight index medium aligned with the weight in graduations on the dial for indicating inclination angles. The disk is supported by a shaft 38. A fluid 42 is used as a lubricant for the shaft and to provide shock absorption and stabilization of leveling wheel, as disclosed on lines 12+, column 3. Johnson does not disclose the use of buoyancy to obtain equilibrium and to eliminate frictional forces.

A possible disadvantage of the high resolution inclinometer as disclosed in the previously filed application is that large changes in temperature and/or pressure may cause voids to form in the fluid cavity. This is the result of differential expansion or contraction of the fluid as a result of these temperatures and/or pressure changes. These voids can form microbubbles which may interfere with the optical detection process used to provide the high resolution inclination angle. For example, the microbubble voids may refract light generated by the light emitting diode so that the optical signal is improperly detected. Consequently, it is extremely important to prevent the formation of these voids for proper operation of a high resolution digital inclinometer using optical and digital encoding device.

Additionally, fabrication of the device is difficult if the optics must be disposed within the fluid cavity. The optics must be precisely aligned to provide proper readings and the fluid cavity must be perfectly sealed to prevent leakage of fluid or air from or into the fluid cavity. The ability to satisfy these requirements in a device which can be readily manufactured and assembled is difficult to achieve.

It is also desirable to design the inclinometer device to minimize the effects of friction when the device is not disposed in a vertical orientation, but rather, at a transverse angle causing the shaft to ride against the bearings and reduce the resolution. Determining the design criteria which affect the resolution of the inclinometer at transverse angles would allow the inclinometer to be designed for maximum resolution.

SUMMARY OF THE INVENTION

The present invention overcomes the disadvantages and limitations of the prior art by providing a fluid cavity which conforms to the shape of a digital encoder to minimize the total amount of fluid within the fluid cavity and thereby minimize the amount of differential expansion and contraction of the fluid so as to prevent the formation of voids and minimize mechanical distortion of the case which can affect the optical detector.

The present invention also provides optically clear surfaces on the outer casing shell so that the optical transmitter and detector can be placed outside of the fluid cavity to allow easy alignment to facilitate efficient and high speed automated production and assembly of the device.

The present invention also includes a process for selecting design criteria to maximize resolution of the digital inclinometer when it is placed at transverse angles by separating the distance at which the radial bearings act upon the shaft, the radius of the shaft and minimizing the coefficient of friction.

A particular application in which the present invention may be used is as an electronic sextant device in which navigational star tables are loaded into a memory and the latitude and longitude of the user can be determined from the inclination angle and a clock signal provided by a digital clock.

The present invention may therefore comprise: an inclinometer for generating information indicative of inclination angles comprising an encoder having a plurality of encoding marks for providing high resolution positional data indicative of a rotational position of a disk encoder means resulting from alignment of the encoder with gravitational field forces, a phase plate having openings which are aligned with the encoding marks of the encoder to provide directional information indicative of directional movement of the encoder, fluid surrounding the encoder for providing a supporting medium for the encoder, a shell for encapsulating the fluid around the encoder, the shell having a shape which substantially conforms to the shape of the encoder to minimize volume of the fluid and, thereby minimize the total amount of expansion and contraction of the fluid within the shell so as to prevent generation of bubbles in the fluid and minimize mechanical distortion of the case which can affect the bearing/pivot geometry, as well as the relative geometric orientation of the optical transmitter/receiver pair, a buoyancy device for maintaining the encoder in substantial equilibrium in the fluid to substantially eliminate frictional forces on the encoder, and a detector for sensing the directional information and the high resolution positional data to produce data signals indicative of inclination angles.

The present invention may also comprise an inclinometer for generating information indicative of inclination angles comprising: an encoder having a plurality of encoding marks for providing high resolution positional data indicative of a rotational position of the encoder resulting from alignment of the encoder with gravitational field forces, a phase plate having openings which are aligned with the encoding marks of the encoder to provide directional information indicative of directional movement of the encoder, a fluid surrounding the encoder for providing a supporting medium for the encoder, a shell for encapsulating the fluid around the encoder, the shell having optical windows formed therein which are substantially aligned with the encoder means to allow passage of light through the encoding marks with minimal refraction, a buoyancy device for maintaining the encoder in substantial equilibrium in the fluuid to substantially eliminate frictional forces on the encoder, and an optical detector mounted on the optical windows for optically sensing the directional information and the high resolution positional data to produce data signals indicative of inclination angles.

The present invention may also comprise a method of achieving increased resolution of transverse angles in an inclinometer which has a digital encoding wheel buoyantly supported in a fluid and mounted on a shaft disposed in alignment bearings at opposite ends of the shaft comprising the steps of: increasing separation of the alignment bearings at the opposite ends of the shaft; decreasing shaft diameter between the alignment bearings at each end of the shaft; and decreasing the coefficient of static friction between the alignment bearings and the shaft.

BRIEF DESCRIPTION OF THE DRAWINGS

An illustrative and one possible preferred exemplary embodiment of the invention is shown in the accompanying drawings, wherein.

DETAILED DESCRIPTION OF THE INVENTION

Figure 1:
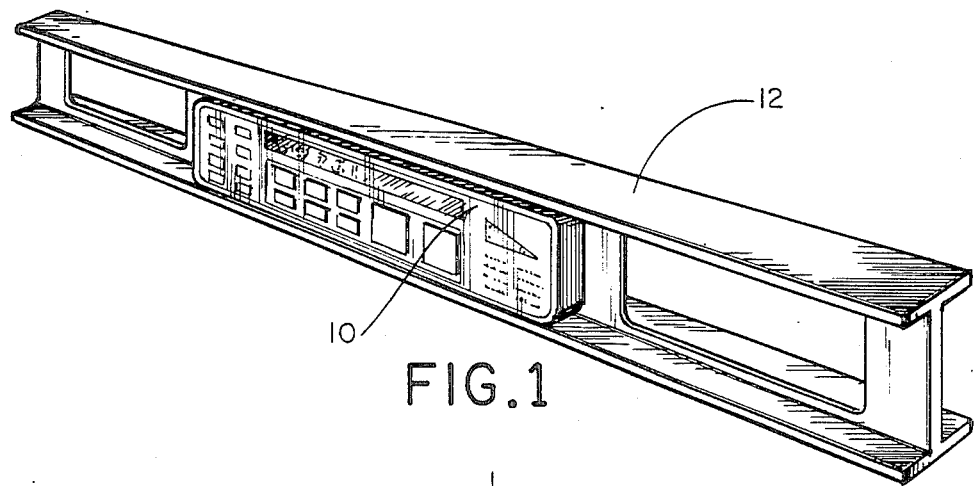
FIG. 1 is a schematic isometric drawing illustrating one application of the present invention.

FIG. 1 illustrates the device of the present invention 10 implemented and mounted in a carpenter's level to provide one possible application of the present invention. The present invention may be incorporated in any holder device, such as carpenter's level 12, to provide a desired function. For example, the mechanical assembly and electronics can also be mounted in an electronic range finder which is capable of generating electronic range data in reponse to optical focusing of an object. This range data can be combined with the angular data derived from the inclinometer of the present invention to generate height readings of distant objects using standard trigonometric functions.

The present invention may also be used in such a device, or more elaborate aiming devices, such as a telescope with cross-hairs. Any of these devices can be used for pointing at celestial bodies to generate navigational data. By loading navigational star charts into an electronic storage of the present invention, calculations can be made as to the location of the user to provide a digital readout is in terms of latitutde and longitude.

Figure 2:
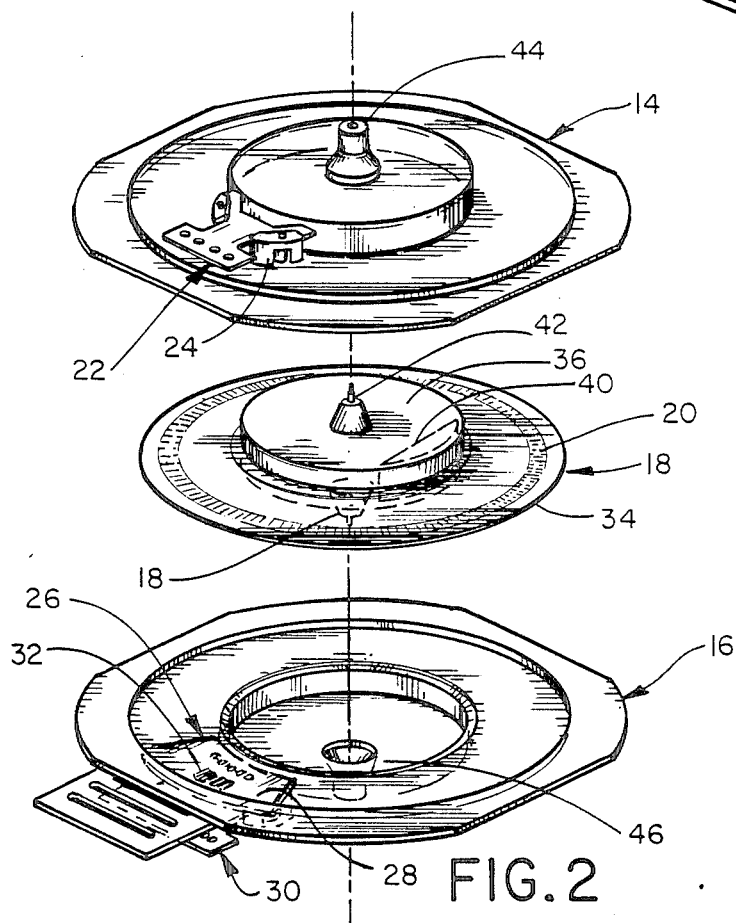
FIG. 2 is a schematic isometric drawing of the primary mechanical components of the digital inclinometer device of the present invention.

FIG. 2 is a schematic isometric view of the inclinometer device of the present invention. The inclinometer device has two shell casing portions 14 and 16 and a rotatable inner portion 18. Both outer shell portions 14 and 16 are conformed to the shape of the rotationl inner portion 18. This reduces the total volume of a fluid within the fluid cavity contained between shell portions 14 and 16. In use, the apparatus of FIG. 2 is rotated 90° from its position of FIG. 2 so that elements 14, 16, and 18 are in a vertical plane.

The total change in fluid volume due to thermal expansion or contraction is directly proportional to the total fluid volume. To minimize this total amount of change in fluid volume, the total volume of fluid is minimized. To accomplish this, the interior geometry of the fluid chamber is made similar to the exterior geometry of the rotatable assembly 18. In this manner, minimal clearance is provided between the outer surfaces of the rotatable assembly 18 and the interior surfaces of container shells 14 and 16 which form the fluid chamber. However, in the process of minimizing these clearances, the rotatable assembly must be able to rotate freely with respect to shell portions 14 and 16. Consequently, the interior of the fluid chamber as well as the exterior surface of the rotor must be volumes of revolution. In other words, any two planes containing the axis of rotation will have geometrically similar intersections with the external surface of the rotating assembly 18.

The necessity for rotational symmetry places the center of buoyancy of the rotor at its center as opposed to being displaced along a diameter opposing the center of gravity, i.e., the point through which the entire buoyant force acts. The advantage is that minimal changes in fluid volume can be absorbed by flexure in the molded plastic pieces which form shell portions 14 and 16. The enlarged surface area of shell portions 14 and 16 increase the ability of these pieces to provide the necessary flexure. Consequently, the need for separate diaphrams and pistons to provide the required flexure is eliminated.

Changes in the temperature or pressure of the environment in which the inclinometer is located can produce voids in the fluid cavity, namely, small bubble-like regions, possibly filled with air previously trapped in solution. These voids can interfere with the optical detectors, so their formation must be prevented.

Two processes contribute to the creation of voids; (1) the differential expansion or contraction of the fluid and the cavity walls; and, (2) the removal of air from solution in the fluid. Both processes are affected by temperature and/or pressure changes. The fluid and cavity walls expand if the temperature increases, and the cavity expands if the external pressure decreases. The solubility of the dissolved air decreases as the pressure decreases in accordance with Henry's Law, or as the temperature increases. By conforming the shell portions 14 and 16 to the shape of rotating assembly 18, the total differential volume of expansion and contraction is decreased. This, together with the design of the outer shell portions 14 and 16, having large flat surface areas, provides for small changes in volumes due to the flexibility of the plastic shell portions 14 and 16 along the flat surface areas. Also, the fluid cavity is filled with a slight surplus of fluid, expanding the plastic shell portions slightly beyond the equilibrium position. Thus, the plastic shell portions exert a continuous inward mechanical force on the fluid. This inward force allows the case to contract when the fluid volume is reduced due to fluid contraction. By removing all gasses and vapors from the fluid before filling the fluid chambers, small voids do not form. Silicone fluid has almost zero vapor pressure at operating temperatures. When the fluid is degassed, bubble formation does not seem to be a problem over operating and storage temperatures with just a bit of inward forces exerted by the case on the fluid so that the case can contract when the fluid contracts due to decreases in temperature.

Thus, the rational of minimizing the fluid volume is to minimize expansion and contraction of the case due to changes in temperature so as to maintain the correct relationship between the emitter 22/detector 30 pair, and between the bearings and pivot.

The formation of voids can additionally be prevented by applying external pressure on the cavity walls from an external source, as set forth in the previously filed application. The pressure can be produced by two axially-located springs, e.g., one on each side of the cavity, or by molding spring-type gussets into the fluid chamber which allow the case to contract as the temperature decreases, causing the fluid to contract. This process will even prevent formation of voids if the device is surrounded by a vacuum. The added pressure removes any voids produced by differential expansion or contraction by simply collapsing the cavity. The pressure also forces any undissolved air back into solution, according to Henry's Law.

The shell portions 14 and 16 can be manufactured from a clear acrylic plastic which is engineered to have optically clear windows lined with the optical encoding marks 20 of rotating assembly 18. An emitter device 22 produces optical energy from devices such as light emitting diodes, as disclosed in U.S. Pat. No. 4,606,133. The emitter device 22 is mounted on the optically clear surface on the outside of shell 14 so that optical energy is transmitted through the optically clear window 24 at a substantially right angle to both the exterior and interior surface of optical window 24 to reduce the effects of refraction.

Shell portion 16 also has an optical window 26 onto which phase plate 28 is mounted on the exterior surface thereof. An optical detector 30 is mounted on a surface of the phase plate 28 and in alignment with phase apertures 32 to detect light transmitted from emitter 22. The optical window is aligned such that optical energy transmitted by the emitter through the encoding marks 20 of rotatable assembly 18 is transmitted through the optical window 26, through phase plate 28 to detector 30. Optical window 26 is substantially normal to the direction of transmission of radiation from emitter 22 to eliminate problems of refraction.

Rotatable assembly 18 is comprised essentially of three portions, i.e., a digital encoding wheel 34, buoyancy housings 36, 38 which have identical weights 40 which are disposed in buoyancy housing 36, 38, and a shaft 42. The digital encoding disk 34 is symmetrically formed with a center hole to fit shaft 42 and thereby align the disk encoding wheel symmetrically with the shaft 42. Similarly, buoyancy housings 36, 38 are symmetrically formed and friction fit to shaft 42. Buoyancy housings 36, 38 are then bonded to digital encoding wheel 34 to form an air tight structure and thereby provide buoyancy to the rotating assembly 18. Weights 40 are carefully selected to exactly offset the buoyancy provided by the displacement of air in the buoyancy enclosure formed by buoyancy housing 36, 38.

As can be seen from FIG. 2, the shell housings 14, 16 are conformed to the shape of the rotating assembly 18 to minimize the amount of fluid required in the fluid chamber. Bearings are mounted in the cone shaped portions 44, 46.

Figure 3:
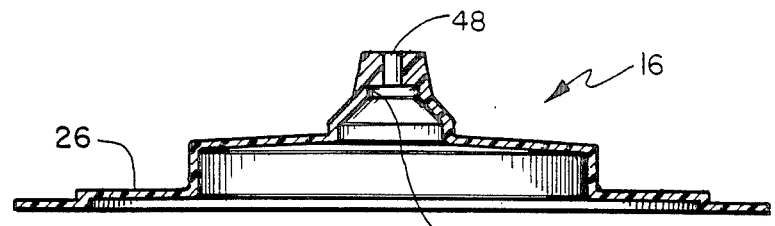
FIG. 3 is a schematic cross-sectional view of one-half of the outer casing shell of the present invention.

FIG. 3 is a schematic cross-sectional view of shell portions 16 illustrated in FIG. 2. As can be seen from FIG. 3, the shape of shell portion 16 conforms to the shape of the rotatable assembly 18 to minimize the total fluid required in the fluid chamber. Shaft 42 is inserted through opening 48 and supported by bearings mounted in opening 50. These bearings can constitute conventional jeweled bearings but need not be expensive or delicate since the shaft will be riding in equilibrium as a result of the balancing of the buoyant force with the gravitational field forces produced by weights 40.

FIG. 3 also illustrates optically clear window 26 which is substantially parallel to the digital encoding wheel 34 of rotatable assembly 18. The optical window 26 is substantially flat and uniform so as to substantially negate refractory effects.

Figure 4:
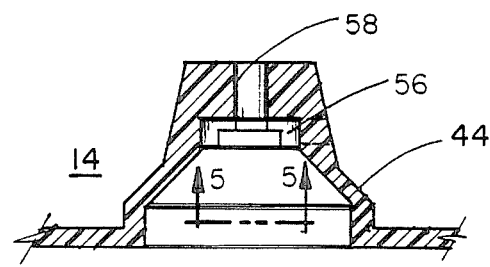
FIG. 4 is a partial cross-sectional view of an opposing portion of the outer shell illustrated in FIG. 3.

FIG. 4 is a schematic cross-sectional diagram of a portion 44 of shell 14 illustrated in FIG. 2. Shell 14 has essentially the same shape as shell 16 for the remaining portions not shown in FIG. 4. FIG. 4 shows the manner in which a bearing seat 56 is mounted in shell portion 44 and the configuration of opening 58. Bearing seat 56 is specially formed to allow fluid to be inserted through opening 58 while the shaft 42 (FIG. 2) is in place against bearing seat 56.

Figure 5:
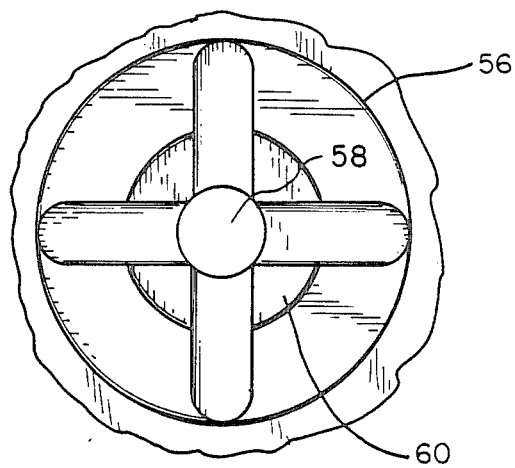
FIG. 5 is a sectional view of FIG. 4.

FIG. 5 is a sectional view illustrating the manner in which bearing seat 56 is mounted in shell portion 44 to allow fluid to be inserted through opening 58. Bearing seat 56 is formed so that fluid can be inserted through opening 58 to flow through opening 60 in bearing seat 56. Bearing seat 56 is friction fit into shell portion 44.

Figure 6:
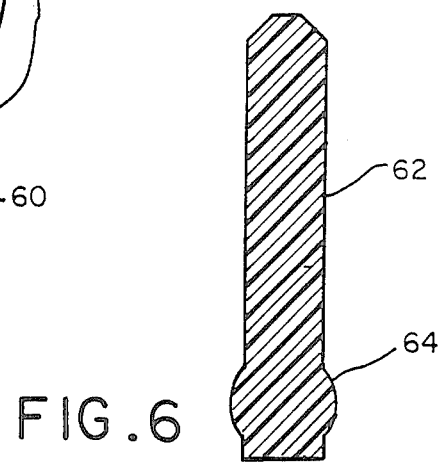
FIG. 6 is a cross-sectional view of a plug device for use with the outer shell illustrated in FIG. 4.

FIG. 6 illustrates a plug 62 which fits into the opening 58 of shell portion 44. Plug 62 has a rounded portion 64 which fits into the rounded configuration of opening 58. Plug 62 can be ultrasonically welded in place to provide a fluid and air tight fit. Protruding portions of plug 62 are then cut off to form a substantially smooth surface.

Figure 7:
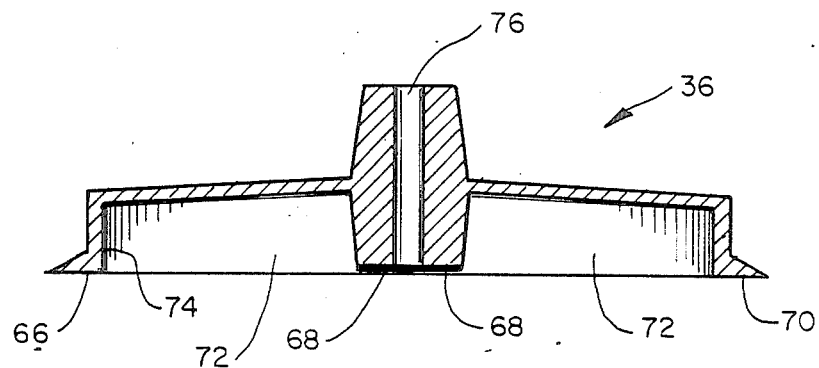
FIG. 7 is a cross-sectional view of one-half of the floatation device used in the present invention.

FIG. 7 is a cross-sectional view of the buoyant enclosure 36 illustrated in FIG. 2. As shown in FIG. 7, surfaces 66, 68, 70 abut against the surface of digital encoding wheel 34 and are bonded in place to form an air tight enclosure 72. A weight is mounted on the inside surface 74 to offset the buoyant effects of the displacement provided by air-tight cavity 72. Opening 76 is formed to cause a friction fit with shaft 42 (FIG. 2) and hold the assembly including an identical buoyancy device 38 mounted on the other side of the digital encoding wheel 34. In this manner, the buoyancy devices 36 and 38, as well as the digital encoding wheel 34, form a singular unit after they are bonded together.

Figure 8:
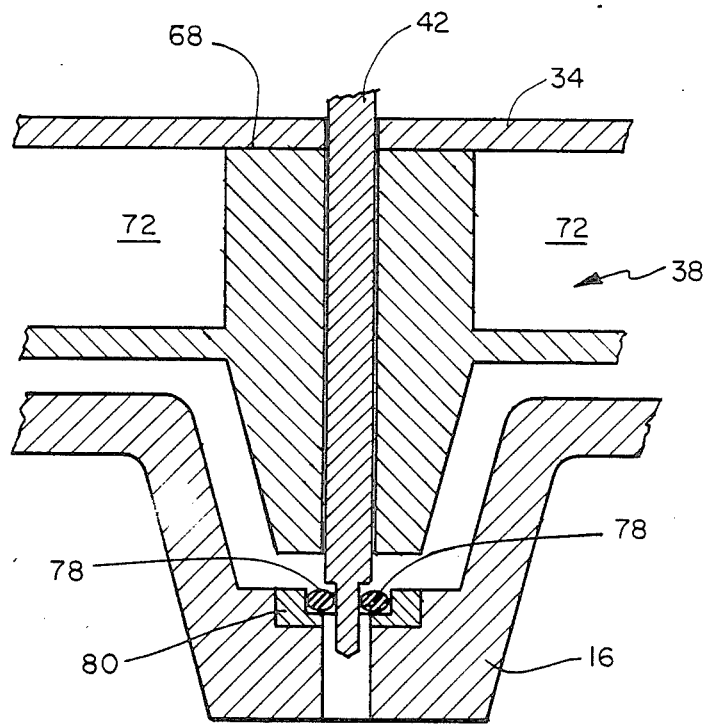
FIG. 8 is a cross-sectional view of a portion of the present invention illustrating the manner in which the bearings engage the shaft of the present invention.

FIG. 8 is a cross-sectional view illustrating the manner in which the bearings 78 engage shaft 42 and the general assembly of one portion of the device. As illustrated in FIG. 8, the buoyancy device 38 is friction fit to shaft 42 and surface 68 is bonded to surface of digital encoding wheel 34 to form air tight cavity 72. Bearings 78 are disposed in a bearing holder 80 which is friction fit within an opening in shell portion 16. Bearings 78 engage shaft 42 such that when the entire rotating assembly is in equilibrium, zero frictional forces are produced on shaft 42.

Figure 9:
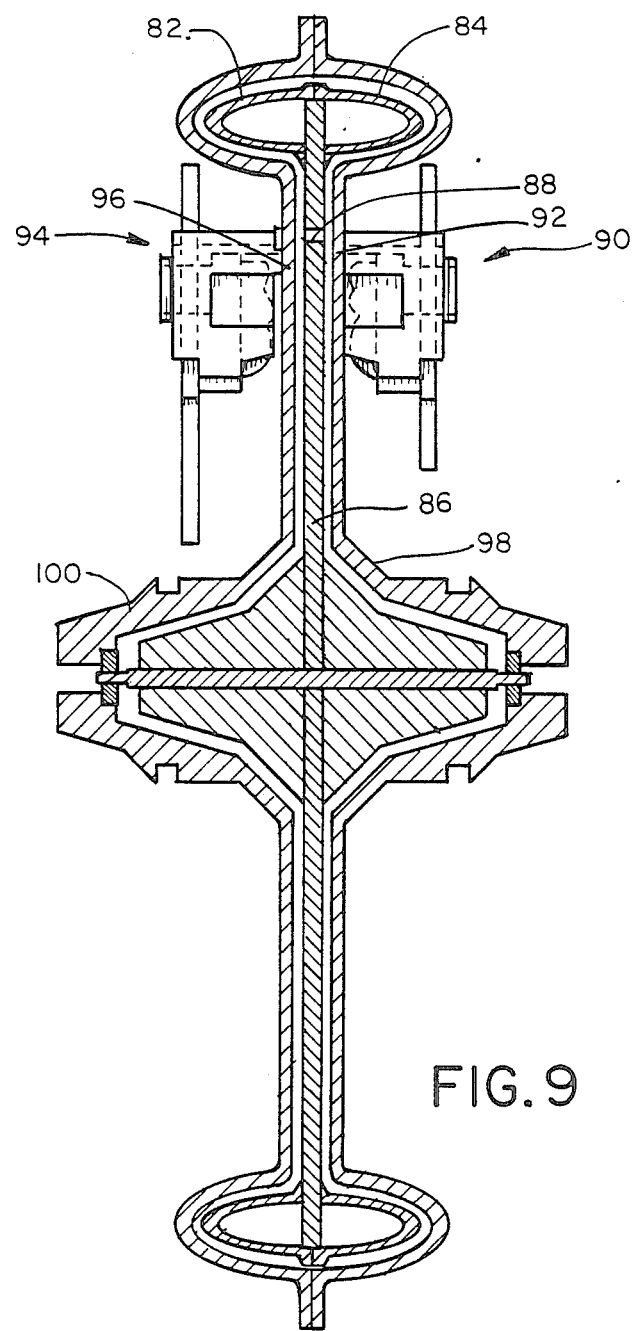
FIG. 9 is a schematic cross-sectional view of an alternative toroidal embodiment of the present invention.

FIG. 9 illustrates an alternative embodiment of the present invention and shows implementation of the present invention in a "toroidal" design. Enclosure devices 82, 84 are bonded or ultrasonically welded to digital encoding wheel 86. As illustrated in FIG. 9, the digital encoding wheel has digital encoding openings 88 which are placed inwardly from the buoyancy produced by enclosures 82, 84. Emitter 90 generates optical energy, as disclosed above, which is transmitted through optically clear window 92 to detector 94 via digital encoding marks 88 and optical window 96. The outer shell casings 98, 100 are designed to conform to the shape of the rotating assembly disposed within the fluid chamber formed by shells 98, 100. The device illustrated in FIG. 9 has a larger righting arm than the embodiment of FIG. 2 and can be used in applications where this is a specific requirement.

Figure 10:
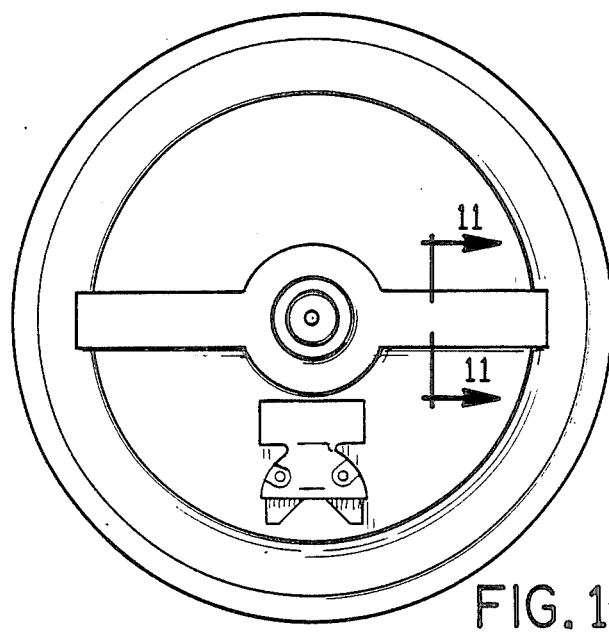
FIG. 10 is a top view of the device illustrated in FIG. 9.

FIG. 10 is a top view of the device illustrated in FIG. 9 showing the manner in which the toroidal assembly is formed.

Figure 11:
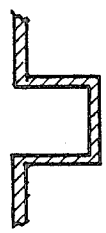
FIG. 11 is cross-sectional view of a portion of FIG. 10.

FIG. 11 is a sectional view of the supporting bracket illustrated in FIG. 10 which is added to the device to give it increased rigidity.

MATHEMETICAL ANALYSIS STATIC EQUILIBRIUM STATE

One of the primary design objectives for this inclinometer is high resolution. Since the device determines its change in angular position by monitoring the pendular rotor, the degree of resolution is very dependent upon the degeneracy of the rotor's static equilibrium state (the state is degenerate if the rotor has more than one equilibrium orientation.) Clearly, in the absence of friction, the pendulum's equilibrium state is its vertical orientation; there is no degeneracy and infinite resolution. However, since there is friction between the rotor's axle and the support bearings, there are nonrestoring torques on the pendulum, altering its equilibrium state, and reducing the resolution. The following illustrates that the actual equilibrium state is a degenerate set of orientations, centered about the vertical orientation.

Figure 12:
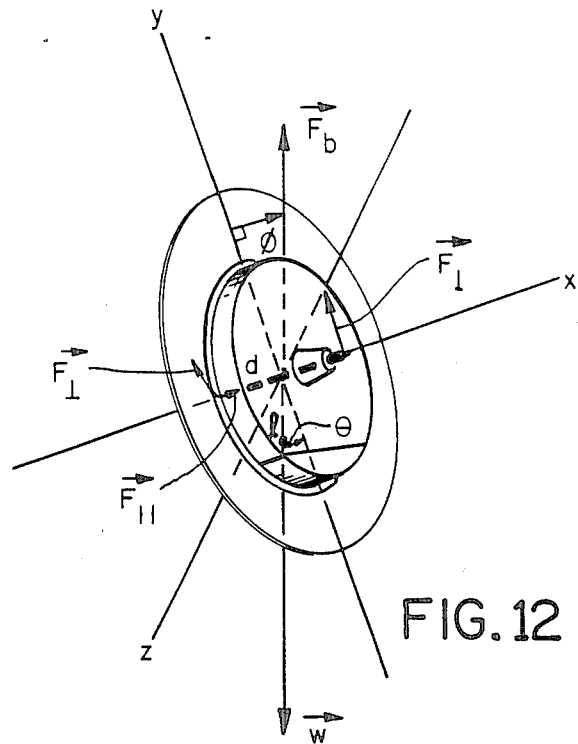
FIG. 12 is a schematic diagram illustrating the manner in which forces act against the rotational portions of the inclinometer of the present invention with respect to a Cartesian coordinate system.

The force diagram for the rotor is shown in FIG. 12. Consider a Cartesian coordinate system with its origin at the rotor's center of symmetry, the x axis coincident with the axis of the axle, and the x-y plane in a vertical plane. Note that the y-z plane is the plane of the rotor's disk.

There are four types of forces acting on the rotor: buoyant, gravitational, reactional, and frictional. The buoyant force, $F_b$, acts vertically upward on the rotor's center of symmetry. Let $\rho$ be the fluid density; V, the volume occupied by the rotor; and g, the acceleration of free fall. Then, $F_b = \rho V g$. The gravitational force, W, acts vertically downward on the rotor's center of mass. Its magnitude is simply the rotor's weight $W = mg$, where m is the mass of the rotor. The distance from the center of symmetry to the center of mass is labeled l and is the length of the pendulum arm.

Figure 13:
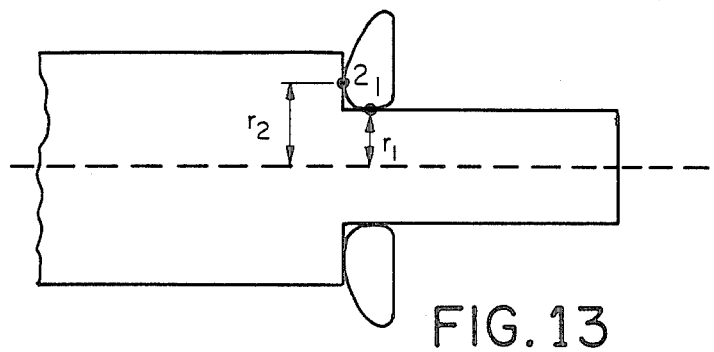
FIG. 13 is a schematic diagram illustrating the manner in which the bearings engage the rotational shaft.

The bearings exert three reactional forces on the axle, i.e., two perpendicular to the axle's length ($F_1$ and $F_1'$), and one parallel to the axle ($F_{11}$). These reactional forces give rise to three frictional forces acting tangential to the axle's surface and perpendicular to its length. FIG. 13 is a blow-up of one of the axle ends and its support bearing. Assume, without loss of generality, that the left end of the axle is lower than the right, and $W \geq F_b$ (both, as indicated in FIG. 12).

The difference between the weight and the buoyancy pushes the axle against the bearings; the bearings respond by exerting an equal but opposite force on the axle. The reactional force is exerted normal to the axle-bearing contact, so a portion acts perpendicular to the axle's length, and the rest, parallel to the axle (see FIG. 13). Also, since the axle is not horizontal, the gravitational force exerts a torque on the rotor, pressing the axle ends against the bearings, causing additional reaction force perpendicular to the axle's length. Therefore (in the light of the two assumptions at the end of the last paragraph), the left end of the axle feels two reactional forces, i.e., $\vec{F_1}$ at point 1 in FIG. 13 and $\vec{F_{11}}$ at point 2; but the right end feels only one, namely, $\vec{F_1'}$ at point 1. Note that $\vec{F_1}$ and $\vec{F_1'}$ are not equal in magnitude or direction.

The distance along the axis of the axle from the center of symmetry to either bearing contact is labeled d and is the lever arm for the torques exerted by $\vec{F_1}$ and $\vec{F_1'}$. The radial distances from the axis of the axle to the points 1 and 2 are labeled $r_1$ and $r_2$, respectively. The coefficient of static friction between the axle and the bearings is given the symbol $\mu$. The angle from the y-z plane to either $\vec{W}$ or $\vec{F_b}$ is labeled $\phi$, and the angle from the y axis to the pendulum arm is labeled $\theta$ (the displacement angle).

When the rotor is in static equilibrium, the value of $\theta$ determines the resolution: the resolution increases as $\theta$ decreases. Hence, let's consider $\theta$ to be a function of ten independent variables, namely, $\rho$, V, g, m, l, d, $r_1$, $r_2$, $\mu$, and $\phi$. These independent variables can be divided into two types, which we label internal and external. The internal variables are a function of the rotor's design and are considered constant parameters of the assembled inclinometer. These variables are V, m, l, d, $r_1$, $r_2$, and $\mu$. The external variables are a function of the operating conditions for the inclinometer. The variables g and $\phi$ are external. The variable $\rho$ is both internal and external, i.e., it is not just internal, because $\rho$ is a function of temperature. Since the optimal design characteristics is $\rho = m/v$, we can define $\rho_0 \equiv m/v$ and $\Delta \equiv |\rho_0 - \rho|$, where $\Delta$ is the variation of $\rho$ due to temperature changes. Note that we have separated $\rho$ into its internal ($\rho_0$) and external ($\Delta$) parts.

Now, the equilibrium equation for $\theta$ can be found as follows. Recall that for a reactional force $\vec{F}$, the static frictional force, $\vec{F_f}$, associated with it obeys the inequality $F_f \leq \mu F$ Since the greater friction implies poorer resolution, the resolution of the device is determined by taking $F_f = \mu F$ Thus, rotational equilibrium (i.e., no net torque) about the x axis implies:

$$lmg \cos \phi \sin \theta - r_2 \mu F_{11} - r_1 \mu F_\perp - r_1 \mu F_\perp' = 0 \quad (1)$$

The first term represents the restoring torque on the pendulum; the other three are the frictional torques. Note that in the absence of friction (i.e., $\mu = 0$) $\theta = 0°$ if $\phi \neq 90°$; and $\theta$ is totally degenerate (i.e, $\theta$ can assume any value between 0° and 180°) if $\phi = 90°$. This is exactly the expected situation.

To find an expression for $F_{11}$ consider translational equilibrium along the x axis, namely, $$F_{11} + F_b \sin \phi - w \sin \phi = 0 \quad (2)$$

Define $\eta \equiv \Delta \rho$; then equation 2 can be rewritten as $$F_{11} = \eta mg \sin \phi \quad (3)$$

Figure 14:
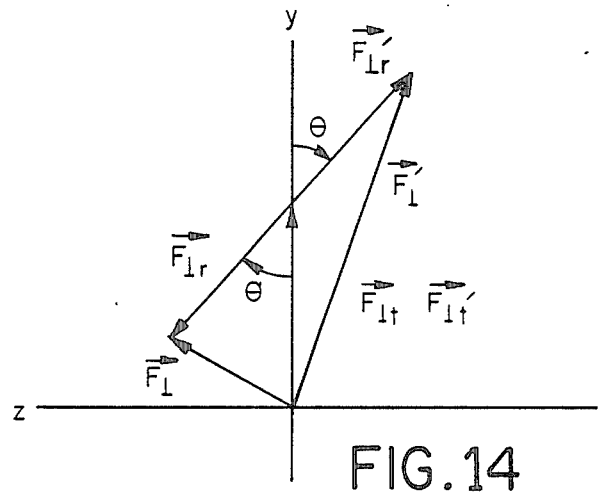
FIG. 14 is a vector diagram illustrating the manner in which vector forces act upon the shaft of the device of the present invention.

As previously discussed, $\vec{F_1}$ and $\vec{F_1'}$ are each the sum of two forces, i.e., a "translational force" ($\vec{F_{1t}}$ or $\vec{F_{1t}'}$) due to the difference between the weight and the buoyancy, and a "rotational force" ($F_{1r}$ or $F_{\perp r}'$) due to the gravitational torque on the rotor. Note that $\vec{F_{\perp t}} = \vec{F_{\perp t}'}$, but $\vec{F_{\perp r}} = -\vec{F_{\perp r}'}$. Because of translational and rotational equilibrium; the expressions for the magnitudes of these forces are easily shown to be:

$$F_{\perp t} = \tfrac{1}{2}\eta mg \cos \phi \quad (4)$$

and $$F_{\perp r} = \tfrac{1}{2} q mg \sin \phi \quad (5)$$

defining $q \equiv l/d$. The vector sums of $\vec{F_{\perp t}}$, $\vec{F_{\perp r}}$ and $\vec{F_{\perp t}'}$, $\vec{F_{\perp r}'}$ are diagrammed in FIG. 14. Using the Pythagorean theorem, the magnitudes of $\vec{F_1}$ and $\vec{F_1'}$ are given by:

$$F_\perp, F_\perp' = [(F_{\perp t} \pm F_{\perp r} \cos \theta)^2 + F_{\perp r}^2 \sin^2 \theta]^{\frac{1}{2}}, \quad (6)$$

the minus sign corresponding to $F_\perp$, and the plus, to $F_\perp'$.

Now, equations 3–6 can be substituted into equation 1, and after a rather lengthy algebraic manipulation we obtain the following equation for $\theta$:

$$\sin^4 \theta - 4\eta p \delta \tan\phi \sin^3 \theta - \quad (7)$$
$$\{\eta[1 - (6p^2 - q^2\delta^2)\tan^2\phi] + q^2\tan^2\phi\}\delta^2\sin^2\theta -$$
$$2\eta[2\eta^2 p^3 \tan^2\phi - p(\eta^2 + q^2\tan^2\phi)]\delta^3\tan\phi\sin\theta +$$
$$\eta^2[q^2 + \eta^2 p^4 \tan^2\phi - p^2(\eta^2 + q^2\tan^2\phi)]\delta^4\tan^2\phi = 0,$$

defining $\delta \equiv \mu r_1/l$ and $p \equiv r_2/r_1$.

Although at first glance equation 7 appears terribly complicated, it actually has a quite simple structure. Notice that it is a quartic equation for $\sin \theta$; and the coefficients are functions of $\delta$, $\rho$, q, $\eta$ and $\tan \phi$. That is, the equilibrium is a function of just three dependent, internal variables ($\delta$, $\rho$ and q) and two independent, external variables ($\eta$ and $\tan \phi$). Also, notice that when the external variables are at their optimal values (viz., $\eta = \tan \phi = 0$), the equilibrium is at $\theta = 0°$ (infinite resolution); and equilibrium is independent of the internal variables.

It is quite reasonable to assume that $\delta$, $\rho$ and q satisfy the following conditions: $\delta << 1$ (i.e., $\mu r_1 << l$), $\rho = O(1)$ (i.e., p is of the order of 1), and $q\delta << 1$ (i.e., $\mu r_1 << d$). This implies that in the coefficient of $\sin^2 \theta$, $6p^2 - q^2\delta^2 \approx 6p^2$ Now, as an example, assume $q = O(1)$; and consider the fairly extremely external conditions of $\eta = O(1)$ and $\tan \phi = O(1)$. Then, all the coefficients in equation 7 consist of a factor of the order of 1, times some power of $\delta$. Observe that, for each of the five terms in equation 7, the order of $\delta$ (in the coefficient) plus the order of $\sin \theta$ (in that term) is equal to 4. Therefore, $\sin \theta = O(\delta)$ and since $\delta << 1$, $\theta$ is small. So even under extreme external conditions, the inclinometer has a definite tendency toward high resolution. This example also shows that to maximize the resolution the internal variable $\delta$ should be minimized as much as structurally possible.

The general effect of the two external variables on the resolution can be seen by considering their effects separately. If $\eta = 0$ (i.e. $\rho = m/v$), then equation 7 yields the solutions $\sin \theta = 0$ (a calculative anomaly) or $$\sin \theta = q\delta \tan \phi \quad (8)$$

Note that sin $\theta$ varies linearly in tan $\phi$, with a slope of $q\delta$.

Equation 8 gives the equilibrium value of $\theta$ for the maximum static frictional force (as assumed at the beginning of the calculation) and hence corresponds to the poorest possible resolution. Let $\overline{\theta}$ be the maximum value of $\theta$; and $\phi_c$, the critical value of $\phi$. That is, $\overline{\theta}=\sin^{-1}(q\delta\tan\phi)$ and $\phi_c=\tan^{-1}(1/q\delta)$. Note that $\overline{\theta}$ is defined only if $0 \leq \phi \leq \phi_c$. Therefore, since the restoring force on the pendulum decreases as $\theta$ decreases (if $\theta \leq 90°$); there is a degenerate set (or sector of equilibrium $\theta$ values) such that $0 \leq \theta \leq \overline{\phi}$ if $0 \leq \phi < \phi_c$ and $0 \leq \theta < 180°$ if $\phi_c \leq \phi \leq 90°$. In other words, for any orientation within this sector, the frictional forces are able to exactly balance the restoring force and hold the rotor away from its vertical orientation. Outside this sector the restoring force is too great, so the rotor will not remain fixed. The rotor will oscillate until fluid damping and kinetic friction lower the amplitude to within the static equilibrium sector and it comes to rest at a turning point.

Note that equation 8 also predicts a sector of equilibrium orientations centered about $\theta=180°$. However, this equilibrium state is unstable because the "restoring force" is directed away from the center of the sector, rather than toward it. If the rotor was oriented at the boundary of this sector (i.e., at the minimum $\theta$, labeled $\overline{\theta}$); then, with the slightest rotation toward lower $\theta$, the restoring force would move it completely away from the sector. The degeneracy (i.e., the angle from $\overline{\theta}$ to 180°) increases as $\phi$ increases, until $\overline{\theta}=90°$ at $\phi=\phi_c$. Thus, the stable and unstable equilibrium sectors meet when $\phi=\phi_c$. This explains why the equilibrium is totally degenerate if $\phi_c \leq \phi \leq 90°$ (as stated above).

If $\phi=0°$, then equation 7 yields the solutions $\sin\theta=0$ or $$\sin\theta = \delta\eta \quad (9)$$

In this example, $\overline{\theta}=\sin^{-1}(\delta\eta)$; and, rather than a $\phi_c$, there is a critical value of $\eta$ (viz., $\eta_c=1/\delta$). This behavior is very similar to that for the case of $\eta=0$. As an aside, observe that equation 9 clearly shows the importance of suspending the rotor in fluid. Even under the best of conditions (viz., $\phi=0°$), if there was no fluid (i.e., $\eta=1$), the resolution would be limited to $\overline{\theta}=\sin^{-1}\delta$.

Ergo, the general behavior of equation 7 as $\eta$ and tan $\phi$ vary, is easily visualized from the special cases of $\eta=0$ and tan $\phi=0$. Imagine a Cartesian coordinate system with the horizontal axes labeled $\eta$ and tan $\phi$ and the vertical axis labeled sin $\theta$. Equation represents a conical surface, "wrapped around" the sin $\theta$ axis with its vertex at the origin. Note that we limit our consideration to the portion of the cone in the octant where all the coordinates are positive. The cross-sections of the cone in the tan $\phi$ − sin $\theta$ and $\eta$ − sin $\theta$ planes are given by equations 8, 9, respectively. The cone does not extend past sin $\theta=1$, and it is easily shown (using equations 1, 3–6) that the cross-section in the sin $\theta=1$ plane is given by the equation $$(\rho\delta n_c \tan\phi_c - 1)^2 - \delta^2(\eta_c^2 + q^2 \tan^2\phi_c) = 0 \quad (10)$$

Now let's review the dependence of the resolution on the complete set of independent variables, namely, $\rho_0$, v, m, l, d, $r_1$, $r_2$, $\mu$, g, $\eta$ and $\phi$. According to equation 7, the equilibrium is not a function of $\rho_0$, v, m, or g. It does not depend on g, because all the forces acting on the rotor are gravity induced: any change in the strength of the gravitational field affects all the forces equally. The dependence on $\rho_0$, v and m vanished, because $\rho_0 = m/v$; that is, the density was optimized to balance out the weight of the rotor and hence minimize the friction between the axle and the support bearings.

The remaining internal variables can be combined into the dependent variables $\tau$, $\rho$ and q. Then (as discussed above) equation 7 can be thought of as the equation for a cone in $\eta$ − tan $\phi$ − sin $\theta$ space, where $\delta$, $\rho$, and q determine the flaring angle of the cone. We have observed that $\delta, q\beta << 1$; so the cone is very broad and lies close to the $\eta$ − tan $\phi$ plane: the resolution is high for small values of $\eta$ and tan $\phi$.

It is also true that, in practice, $\eta$ is quite small (say, less than 5%). Thus, equation 8 is a fairly good approximation of the rotor's behavior. Note that if equation 8 is written in terms of the independent variables, namely, $$\sin\theta = (\mu r_1/d)\tan\phi \quad (11)$$

then the l-dependence drops out. This shows that to achieve high resolution it is very important to have $\mu r_1/d$ as small as possible, regardless of the length l. The l drops out because, when $\eta=0$, all the friction is due to the gravitational torque, and the gravitational and restoring torques both have lever arms of length l. Equation 10 is the lowest order expression for the resolution of the inclinometer, i.e., it exhibits the fundamental behavior of the rotor.

CELESTIAL NAVIGATION

One of the many possible applications of the inclinometer is in a celestial navigational instrument, i.e., a device to determine the user's longitude and latitude on the earth from the observed positions of celestial bodies. The envisioned instrument would have five basic components: a sighting telescope, an inclinometer, a compass, a chronometer, and a microprocessor. The compass would be used to measure angles in the horizontal plane. It would be designed very similarly to the inclinometer, incorporating a code wheel and optical sensor, a flotation fluid, etc.

The position of any celestial body in the reference frame of an earthbound observer is given by two coordinates, i.e., the azimuth and the elevation. The azimuth, K, is the horizontal angle from north, clockwise, to the celestial body. The elevation, a, is the vertical angle from the horizon to the body.

The azimuth and elevation are a function of five quantities: the longitude, x, of the observer; the latitude, $\Psi$; the rotation of the earth (i.e., the time of day at some fixed longitude); the right ascension, $\alpha$, of the celestial body; and its declination, $\delta$. The right ascension and declination are the coordinates of the body on the celestial sphere.

The celestial sphere is an imaginary sphere of infinite radius (i.e., very large radius) upon which the stars are fixed. Its center is at the center of the earth, and its equator is a projection of the earth's equator; so its poles are a projection of the earth's poles. The earth is imagined to be motionless, while the celestial sphere (i.e., the bodies) moves around it. The sphere (and the stars) rotate clockwise, once on its axis each day. The sun, moon, planets, etc. also move with this rotation; but, in addition, they move relative to the celestial sphere. The celestial coordinates change with time. For example, the sun travels in a circular path around the celestial sphere once each year.

The path followed by the sun is called the ecliptic. Since both the ecliptic and the celestial equator are great circles, they cross each other at two diametrically-opposite points. The sun travels counterclockwise around the ecliptic, relative to the celestial North Pole; and the point at which it passes northward across the celestial equator is called the first point of Aries. (This event is known as the vernal equinox.) The right ascension of a celestial body is the angle from the first point of Aries, counterclockwise along the celestial equator, "to the body." The declination is the angle from the celestial equator to the body, i.e., a positive quantity in the northern celestial hemisphere, and negative in the southern.

The basic operation of the instrument would proceed as follows: the user sights the telescope on a celestial body; the inclinometer measures its altitude; the compass measures its azimuth; the chronometer reports the time of day; and then the microprocessor uses this information to calculate the user's longitude and latitude. This would be the general order of operation, but there would be two specific modes of operation, i.e., one for which the user would sight two celestial bodies, and one requiring only a single sighting (e.g., the sun).

In the two-body mode, X and $\Psi$ would be determined without the use of the compass (i.e., no K information). The microprocessor would contain a catalog of celestial bodies along with the correct ascensions and declinations of these bodies. The user would have the option of either selecting a body from the microprocessor's catalog (say, number 15), or entering the values of $\alpha$ and $\delta$ for the desired celestial body.

To determine the longitude and latitude, the microprocessor would simultaneously solve the following two linear equations (one for each body):

$$\cos\delta_1[\cos\alpha_1 \cos(\phi + \omega t_1) + \sin\alpha_1 \sin(\phi + \omega t_1)]\cos\psi +$$

$$\sin\delta_1 \sin\psi - \sin a_1 = 0$$

and $$\cos\delta_2[\cos\alpha_2 \cos(\phi + \omega t_2) + \sin\alpha_2 \sin(\phi + \omega t_2)]\cos\psi +$$

$$\sin\delta_2 \sin\psi - \sin a_2 = 0$$

In these equations, the latitude ($\Psi$) is positive in the northern terrestrial hemisphere and negative in the southern. The longitude is expressed in terms of $\phi$, the angle from the prime meridian (i.e., $\chi = 0°$), counterclockwise with respect to the North Pole, to the user's meridian (that is, the line of longitude passing through the user's location). The quantity $\omega t$ is the angle through which the celestial sphere has rotated ($\omega$=angular velocity), from a given time and place. The place of reference is the prime meridian, and $t=0$ when the first point of Aries passes across the prime meridian's celestial meridian. The celestial meridian is the projection of an observer's terrestrial meridian onto the celestial sphere.

Once the microprocessor had determined and displayed $\chi$ and $\Psi$ (e.g., 55° W, 10° S), the user could request the magnetic declination at the location. The magnetic declination, $\sigma$, is the angle from the observed direction to the North Pole, to that to the earth's Magnetic North Pole (the direction a compass needle points). The quantity has both a magnitude and a direction, for example, 12° E. The equation for the magnitude of $\sigma$ is $$\tan\sigma = \frac{\sin^2(\phi + \phi_{MN})}{\sin\psi_{MN}\cos\psi - \cos(\phi + \phi_{MN})/\sin(\phi + \phi_{MN})/\sin\psi} \quad (1)$$

where the subscript MN indicates the values of $\phi$ or $\Psi$ at the Magnetic North Pole.

In the one-body mode of operation, the microprocessor would use both k and a, for the body, to determine $\chi$ and $\Psi$. This would be accomplished with the following two equations:

$$\cos\delta[\sin\alpha\cos(\phi + \omega t) - \cos\alpha\sin(\phi + \omega t)] - \quad (2)$$

$$\sin k \cos a = 0$$

and $$\cos\delta[\cos\alpha\cos(\phi + \omega t) + \sin\alpha\sin(\phi + \omega t)]\cos\psi + \quad (3)$$

$$\sin\delta\sin\psi - \sin a = 0$$

There is one complication, however. The compass does not actually measure K (the angle from true north); it measures the angle from magnetic north, that is, the magnetic azimuth, k. The values of k and K are related by the equation $K + s(360°) = k + \sigma$, where $s = -1, 0,$ or 1 and $\sigma > 0$ for easterly declinations and $\sigma < 0$ for westerly declinations. Thus, in equation 2, $\sin k = \sin(k + \sigma)$.

An iterative process would be used to solve equations 1–3, namely: replace $\phi$, $\Psi$, and $\sigma$ in equations 2, 3 by $\phi_n$, $\Psi_n$, and $\sigma_n$ ($n = 0, 1, 2 \ldots$), and replace them by $\phi_n$, $\Psi_n$, $\sigma_{n+1}$ in equation 1; let $\sigma_0 = 0$, then solve equation 2 for $\phi_0$; plug $\phi_0$ into equation 3 and solve it for $\Psi_0$; plug $\phi_0$ and $\Psi_0$ into equation 1 and solve it for $\sigma_1$; plug $\sigma_1$ into equation 2 and solve it for $\phi_1$; etc. For large values of n, $\phi_n$ and $\Psi_n$ approach the exact values of $\phi$ and $\Psi$ at the user's location. Note that equation 1 does not give the sign of $\sigma$; this would be determined by the microprocessor's algorithm. Once $\phi$ and $\Psi$ had been calculated to an appropriate degree of accuracy, the instrument would display $\chi$ and $\Psi$; and, as in the two body mode, the user could also request the value of $\sigma$ (which would be an appropriate approximation of the exact value).

In addition to keeping track of the time of day, the chronometer can also function as a calendar. The date is used by the microprocessor to calculate current values of $\alpha$ and $\delta$. The right ascension and declination of a celestial body change with time, due mostly to the precession of the earth's axis and the body's proper motion. The precession of the earth's axis causes the first point of Aries to slowly move along the celestial equator, making $\alpha$ a function of time. Proper motion is any motion independent of the rotation of the celestial sphere, for example, the movement of the sun along the ecliptic or the movement of starts to their relative velocities within the galaxy. In other words, the instrument not only follows the year-round movement of the sun and moon, but it also keeps track of the deviations from the ideal celestial sphere, which assumes the earth's rotation axis and the stars are fixed.

The present invention therefore provides a device which minimizes differential expansion and contraction of the fluid by minimizing the total amount of fluid. Additionally, the optics are mounted on the outer surface to reduce complexity of the device to aid in assembly. The outer casing is formed with large surface areas which allow flexure and easily compensate for expansion and contraction and provide optically flat windows for mounting of the optics on the outer surface. Additionally, a mathematical model has been presented to aid in the design of the device to minimize frictional effects and the resultant degradation of resolution when the inclinometer is operated at a transverse angle. The present invention can also be used as a celestial navigational instrument which is capable of providing a digital readout in terms of latitude and longitude of the user.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to their particular use contemplated. It is intended that the appended claims be construed to include other alternative embodiments of the invention except insofar as limited by the prior art.

What is claimed is:

1. An inclinometer for generating information indicative of inclination angles comprising:
   disk encoder means;
   means for aligning said disk encoder means with gravitational field forces,
   said disk encoder means having a plurality of encoding marks for providing high resolution positional data indicative of a rotational position of said disk encoder means resulting from alignment of said disk encoder means with gravitational field forces;
   phase means which are aligned with said encoding marks of said encoder means to provide directional information indicative of directional movement of said disk encoder means;
   fluid means surrounding said disk encoder means for providing a supporting medium for said disk encoder means;
   shell means for encapsulating said fluid means around said disk encoder means, said shell means having a shape which substantially conforms to the shape of said disk encoder means to minimize volume of said fluid means and, thereby minimize the total amount of expansion and contraction of said fluid means within said shell means so as to minimize mechanical distortions of the shell means;
   buoyancy means for maintaining said disk encoder means in substantial equilibrium in said fluid means to substantially eliminate frictional forces on said disk encoder means;
   said aligning means comprising counterweight means for displacing the center of gravity of said disk encoder means by creating a righting arm which aligns said disk encoder means with gravitational field forces; and
   detector means for sensing said directional information and said high resolution positional data to produce data signals indicative of inclination angles.

2. The inclinometer of claim 1 wherein said buoyancy means further comprises:
   buoyancy float means located radially outwardly from said encoding marks on said encoding means.

3. The inclinometer of claim 1 wherein said buoyancy means further comprises:
   buoyancy float means located radially inwardly from said encoding marks on said encoding means.

4. An inclinometer for generating information indicative of inclination angles comprising:
   disk encoder means,
   means for aligning said disk encoder means with gravitational field forces,
   said disk encoder means having a plurality of encoding marks for providing high resolution positional data indicative of a rotational position of said disk encoder means resulting from alignment of said disk encoder means with gravitational field forces;
   phase means which are aligned with said encoding marks of said disk encoder means to provide directional information indicative of directional movement of said disk encoder means;
   fluid means surrounding said disk encoder means for providing a supporting medium for said disk encoder means;
   shell means for encapsulating said fluid means around said disk encoder means, said shell means having a shape which substantially conforms to the shape of said disk encoder means to minimize volume of said fluid means and, thereby minimizes the total amount of expansion and contraction of said fluid means within said shell means so as to minimize mechanical distortions of the shell means, said shell means having optical windows formed therein which are substantially aligned with said encoder means to allow passage of light through said encoding marks with minimal refraction;
   buoyancy means for maintaining said disk encoder means in substantial equilibrium in said fluid means to substantially eliminate frictional forces on said encoder disk means;
   optical emitter means mounted proximate a first one of said windows for passing optical signals through said windows and said phase means and said encoding marks of said disk encoding means,
   optical detector means mounted on a second one of said optical windows for receiving said optical signals from said emitter means, said detector means being responsive to the reception of said optical signals to generate directional information and said high resolution positional data to produce data signals indicative of inclination angles.

5. The inclinometer of claim 4 wherein said disk encoder means comprises a shaft, a digital encoding wheel mounted on said shaft and buoyantly supported in said fluid means, a pair of alignment bearings with the opposing end of said shaft being disposed in said alignment bearings.

6. An inclinometer for generating information indicative of inclination angles comprising:
   disk encoder means,
   means for aligning said disk encoder means with gravitational field forces,
   said disk encoder means having a plurality of encoding marks for providing high resolution positional data indicative of a rotational position of said disk encoder means resulting from alignment of said disk encoder means with gravitational field forces;
   fluid means surrounding said disk encoder means for providing a supporting medium for said disk encoder means;

shell means for encapsulating said fluid means around said disk encoder means, said shell means having a shape which substantially conforms to the shape of said disk encoder means to minimize volume of said fluid means and, thereby minimize the total amount of expansion and contraction of said fluid means within said shell means so as to minimize mechanical distortions of the shell means;

buoyancy means for maintaining said disk encoder means in substantial equilibrium in said fluid means to substantially eliminate frictional forces on said disk encoder means;

said aligning means comprising counterweight means for displacing the center of gravity of said disk encoder means by creating a righting arm which aligns said disk encoder means with gravitational field forces; and detector means for sensing said high resolution positional data to produce data signals indicative of inclination angles.

* * * * *